Patented Oct. 16, 1923.

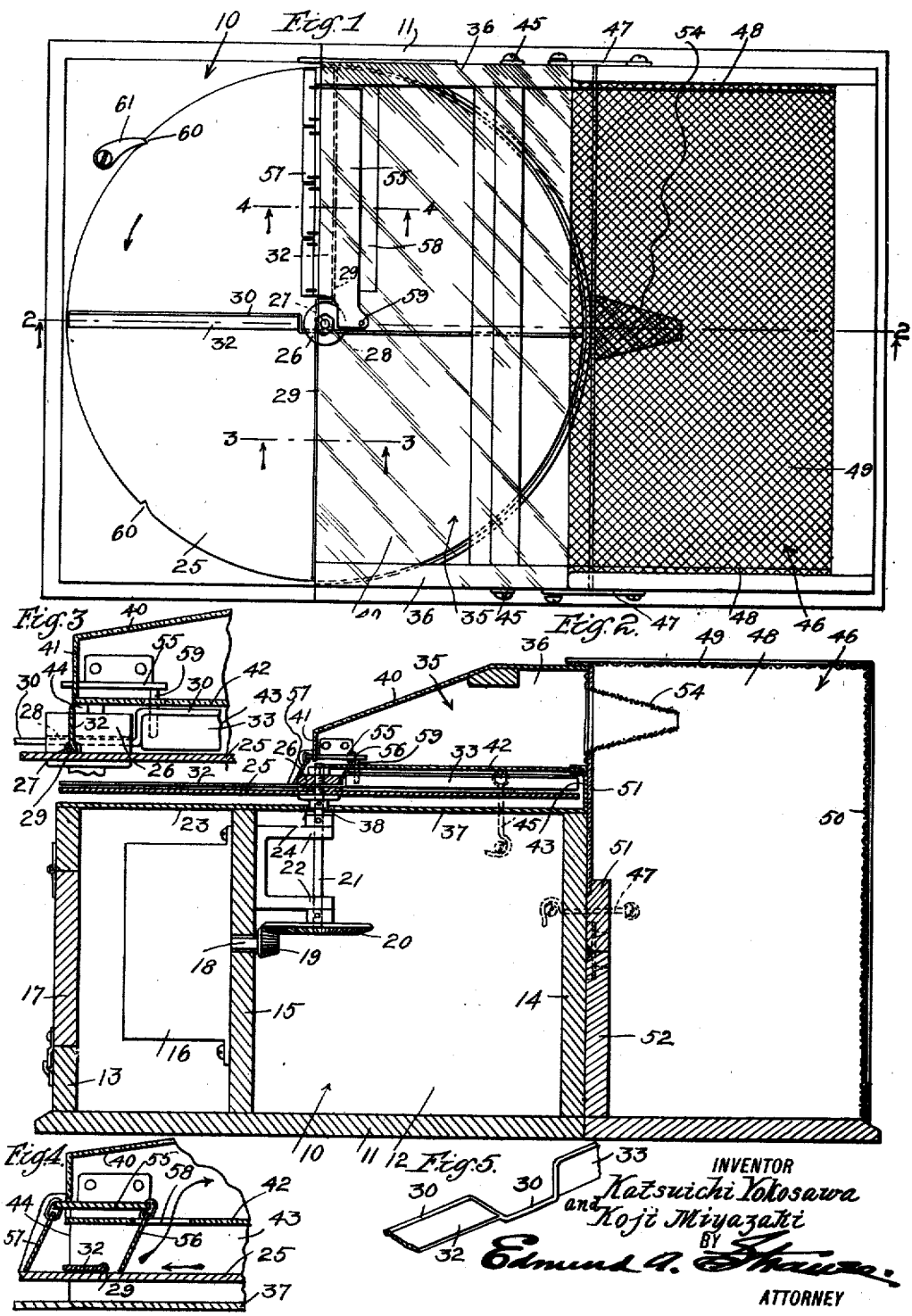

1,471,086

UNITED STATES PATENT OFFICE.

KATSUICHI YOKOSAWA AND KOJI MIYAZAKI, OF LOS ANGELES, CALIFORNIA; SAID YOKOSAWA ASSIGNOR TO SAID MIYAZAKI.

FLYTRAP.

Application filed June 1, 1920. Serial No. 385,568.

*To all whom it may concern:*

Be it known that we, KATSUICHI YOKOSAWA and KOJI MIYAZAKI, citizens of Japan, residing at Los Angeles, in the county of Los Angeles and State of California, have invented new and useful Improvements in Flytraps, of which the following is a specification.

Our invention relates to fly traps which are particularly adapted for use in kitchens, dining rooms, and in hospitals, where it is desirable to catch the flies alive and subsequently destroy them, in order that all danger of dead or half dead flies lying around and falling into the food or spreading contagion will be avoided.

The object of our invention is to provide a simple, durable and efficient apparatus which will accomplish the above mentioned purpose.

Other objects will appear in the following description, will be pointed out in the claims and will be embodied in the accompanying drawings, in which:

Fig. 1 is a plan view of our apparatus.

Fig. 2 is a longitudinal section through the same, taken on the line 2—2 of Fig. 1, viewed in the direction indicated by the arrows.

Fig. 3 is an enlarged fragmental section taken on the line 3—3 of Fig. 1, viewed in the direction indicated by the arrows, some of the parts which would appear in the background being omitted.

Fig. 4 is an enlarged fragmental section taken on the line 4—4 of Fig. 1, viewed in the direction indicated by the arrows.

Fig. 5 is an enlarged fragmental perspective view of one of the movable parts of the apparatus.

Referring more specifically to the accompanying drawings, 10 represents a suitable casing provided with a bottom 11, side walls 12 and front and rear walls 13 and 14. The casing 10 is provided with a partition 15 on which is secured a motor 16 of any desired type adapted for slow movement, and in order that ready access to said motor may be had, the wall 13 is provided with a door 17. The shaft 18 of motor 16 passes through an aperture in wall 15 and is provided on its outer end with a bevel pinion 19 adapted to mesh with the bevel gear 20 secured to the lower end of a vertically disposed shaft 21 mounted in suitable bearings 22.

The casing 10 is provided with a top plate 23 adjacent its forward end and the shaft 21 passes through a notch 24 in the rear edge of said top plate and has secured to its upper end a bait receiving disk 25 provided with a hub 26. The hub 26 is provided with a pair of transversely disposed grooves 27 and 28 arranged at right angles with respect to each other, in which are journaled for rocking movement the wires 29 and 30, which extend entirely across the disk 25 and are adapted to rest adjacent its upper surface. The wires 29 and 30 are identical in construction and each is bent into the shape of a crank, adjacent the hub 26, and has secured to its outer ends the fins 32 and 33 so arranged that when said wires are rocked, said fins will alternately stand in an upright position or in a flat position adjacent the upper surface of disk 25, as more clearly shown in Fig. 5 of the drawings.

Mounted over the rear half of disk 25 is a receptacle 35 provided with side walls 36, and a bottom plate 37 adapted to rest on walls 12 of casing 10, and to register with top plate 23, said top plate being provided with a semi-circular notch 38 through which the shaft 21 passes. The receptacle 35 is also provided with a top 40, a front wall 41 and an auxiliary bottom 42, all of which are preferably formed of some transparent material such as celluloid or glass. The space between bottom 37 and auxiliary bottom 42 forms a pocket 43 into which the disk 25 projects, the front wall 41 of which being cut away as at 44 for this purpose. The space between bottom 42 and disk 25 is sufficient to admit of the passage of fin 33 therebetween when in an upstanding position, as well as an ordinary fly when in a feeding position.

The receptacle 35 is detachably secured to the casing 10 by means of the hooks 45 in order that said receptacle may be conveniently removed when desired, for the purpose of cleaning the same.

Mounted adjacent the rear wall 14 of casing 10 is a cage 46, which is detachably secured to the casing 10 by means of the hooks 47. The cage 46 is preferably provided with side walls 48 of wood or other suitable material, and top and rear walls 49 and 50 preferably composed of wire screening. The cage 46 is also provided with a front wall 51 which is provided with a hinged door 52, as clearly shown in Fig. 2 of the drawings. The front wall 51 is preferably formed of thinner material at its upper portion, and extends upwardly to form a closure between receptacle 35 and cage 46, and in order that communication may be had between receptacle 35 and cage 46, a conical shaped tube 54, preferably formed of woven wire, is mounted in wall 51, the contracted end of said tube projecting into cage 46.

Secured to one of the walls 36 of receptacle 35 is an inwardly extending arm 55 upon which is hinged a plurality of plates 56, the lower edges of which are adapted to rest upon the disk 25, and hinged to arm 55 just forward of plates 56, is another group of plates 57, the lower edges of which are also adapted to rest upon the disk 25. The plates 56 pass downwardly through a slot 58 formed in the auxiliary bottom 42 of receptacle 35, said slot extending a suitable distance back of plates 56, as clearly shown in Figures 1 and 4 of the drawings. Projecting downwardly from arm 55 through a perforation in auxiliary bottom 42 is a pin 59 adapted to project into the path of fins 32 and 33, said pin being adapted to shift said fins from an upright to a horizontal position, as will hereinafter be more fully described.

In order that the disk 25 may be held from movement we provide said disk with a plurality of notches 60 on its peripheral surface adapted to engage with a brake pawl 61 pivoted to the top 23 of casing 10, as clearly shown in Fig. 1 of the drawings.

In the operation of our apparatus the upper surface of the disk 25 is spread with a suitable bait, such as sugar, or other sweet food. The pawl 61 is released from engagement with the disk 25, which is then set in motion by means of the motor 16, said disk moving in the direction indicated by the arrow in Fig. 1. The flies are attracted by the bait on the disk 25 and light thereon. The disk 25 is so geared to motor 16 that a very slow movement will be imparted thereto so that the flies will not be frightened. As the flies are intent on feeding they will not notice the movement of disk 25 and will thereby be carried into the pocket 43 of receptacle 35 and will then be captured in said pocket, as the opening 44 will be closed on one side of the disk hub 26 by means of a fin 32 or 33, which is at this time in an upright position, and on the opposite side of hub 26 by means of the swinging plates 56.

As the disk 25 continues in its movement the fin 32 engages with the pin 59 which causes said fin to rest flat against the disk 25 and the fin opposite the same to assume an upright position, ready to form another closure for opening 44. The flies being still intent on feeding are carried around on the disk 25 until they come in contact with the yielding or hinged plates 56, and when touched by the same are frightened, and as it is the nature of a fly when disturbed, to start to ascend upwardly, they will naturally fly through the slot 58 in the auxiliary bottom 42 and will therefore become confined in the main portion of receptacle 35. In due time the flies will pass through the conical shaped tube 54 into the cage 46, and as said tube is contracted at its outlet end, the flies will be unable to escape therefrom. A suitable receptacle (not shown) provided with poisoned food matter may be placed in the bottom of cage 46 and when the flies attack this food they are exterminated. If it is not desired to use poisoned food in cage 46 it is obvious that by simply releasing the hook 47, the cage may be removed from the casing 10 and immersed in water, or the flies may be exterminated in any other suitable manner, and when exterminated the remains may be removed from said cage by means of the door 52.

The notches 60 in disk 25 are so arranged that when the pawl 61 becomes engaged with one of them, the opening 44 will be held closed by the fin 32 or 33. It is obvious by this arrangement that when the trap is not in motion that any flies confined in receptacle 35 will have no means of escape other than through the tube 54 into the cage 46.

To compensate for the unevenness of the bait material on disk 25, a plurality of the plates 56 are provided, thus it will be seen that should a lump appear on the disk in any one spot, only one of said plates will be lifted, thereby guarding against the escape of a fly through the aperture which may be formed between said plates and the disk. Should any of the plates 56 for any cause be held permanently out of engagement with the disk 25, the second set of plates 57 is provided, thus preventing the escape of any flies which have already been confined in pocket 43.

By the foregoing description of the construction and mode of operation of our invention, it will be observed that we have devised a very efficient and simple trap for the catching of flies in a live state, whereby they may be eventually exterminated, thus avoiding the objection of having weak or dead flies scattered around to spread contagion or to find their way into the food.

What we claim is:

1. A fly trap, including a main casing, a prime mover mounted in said casing, a bait receiving disk rotatably mounted above the casing and connected with the prime mover so as to be rotated thereby, a receptacle mounted on the casing and covering a segment of the rotating disk, said receptacle having inlet and outlet openings for said disk, a crank arm provided with closure plates mounted on said disk adapted to close said inlet opening at predetermined intervals, and means mounted on said receptacle for operating said crank arm on a movement of the disk.

2. A fly trap, including a main casing, a prime mover mounted in said casing, a bait receiving disk rotatably mounted above the casing and connected with the prime mover so as to be rotated thereby, a receptacle mounted on the casing and covering a segment of the rotating disk, said receptacle having inlet and outlet openings for said disk, a bearing hub mounted on the upper face of said disk at the center thereof, a crank arm mounted to rotate in said bearing hub, the ends of the crank arm extending outwardly and terminating adjacent the periphery of said disk, and a flat fin or closure plate secured to each arm of said crank arm, said fins adapted to close the inlet opening of the receptacle at predetermined intervals, and means mounted on said receptacle for operating said crank arm on a rotation of said disk.

In witness that we claim the foregoing we have hereunto subscribed our names this 13th day of April, 1920.

KATSUICHI YOKOSAWA.
KOJI MIYAZAKI.